US011087223B2

(12) United States Patent
Nandakumar et al.

(10) Patent No.: US 11,087,223 B2
(45) Date of Patent: Aug. 10, 2021

(54) LEARNING AND INFERRING INSIGHTS FROM ENCRYPTED DATA

(71) Applicant: International Business Machines Corporation, Armonk, NY (US)

(72) Inventors: Karthik Nandakumar, Jurong West (SG); Nalini K. Ratha, Yorktown Heights, NY (US); Shai Halevi, Elmsford, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/032,710

(22) Filed: Jul. 11, 2018

(65) Prior Publication Data

US 2020/0019867 A1  Jan. 16, 2020

(51) Int. Cl.
| | |
|---|---|
| *G06F 21/62* | (2013.01) |
| *G06N 5/04* | (2006.01) |
| *H04L 9/00* | (2006.01) |
| *G06N 20/00* | (2019.01) |

(52) U.S. Cl.
CPC ............ *G06N 5/04* (2013.01); *G06F 21/6218* (2013.01); *G06N 20/00* (2019.01); *H04L 9/008* (2013.01)

(58) Field of Classification Search
CPC ...... G06F 21/6218; G06N 5/04; G06N 20/00; G06N 99/005; H04L 9/008
See application file for complete search history.

(56) References Cited

U.S. PATENT DOCUMENTS

| | | |
|---|---|---|
| 2017/0039487 A1 | 2/2017 | Naganuma et al. |
| 2017/0372226 A1 | 12/2017 | Costa et al. |
| 2018/0144152 A1* | 5/2018 | Greatwood ........... G06F 21/602 |

(Continued)

FOREIGN PATENT DOCUMENTS

WO   2017134269 A1   2/2017

OTHER PUBLICATIONS

R. Agrawal and R. Srikant. Privacy-preserving data mining. In W. Chen, J. F. Naughton, and P. A. Bernstein, editors, Proceedings of the 2000 ACM SIGMOD International Conference on Management of Data, May 16-18, 2000, Dallas, Texas, USA., pp. 439-450. ACM, 2000.

(Continued)

*Primary Examiner* — Olugbenga O Idowu
(74) *Attorney, Agent, or Firm* — Harrington & Smith

(57) ABSTRACT

A computer system receives a set of data encrypted by a homomorphic encryption transformation. The computer system performs machine learning operations using the encrypted set of data. The machine learning operations build, using homomorphic operations, a trained model of the data having a mapping between the encrypted data and output of the trained model. The model is stored for use for performing inferencing of other encrypted data to determine a corresponding output of the trained model. The computer system may perform inferencing of the other encrypted data at least by accessing the stored trained model and predicting by using the trained model a label in an encrypted format that corresponds to the other encrypted data. The computer system may send the label toward the client for the client to decrypt the label.

17 Claims, 6 Drawing Sheets

(56) References Cited

U.S. PATENT DOCUMENTS

2018/0359078 A1* 12/2018 Jain .................... G06F 21/602
2019/0296910 A1* 9/2019 Cheung ............... G06F 21/6245

OTHER PUBLICATIONS

M. Barni, C. Orlandi, and A. Piva. A privacy-preserving protocol for neural-network-based computation. In Proceedings of the 8th Workshop on Multimedia and Security, MM&Sec '06, pp. 146-151, New York, NY, USA, 2006. ACM.
D. Boneh, C. Gentry, S. Halevi, F. Wang, and D. J. Wu. Private database queries using somewhat homomorphic encryption. In ACNS, vol. 7954 of Lecture Notes in Computer Science, pp. 102-118. Springer, 2013.
Z. Brakerski. Fully homomorphic encryption without modulus switching from classical gapsvp. In R. Safavi-Naini and R. Canetti, editors, CRYPTO, vol. 7417 of Lecture Notes in Computer Science, pp. 868-868. Springer, 2012.
Z. Brakerski, C. Gentry, and V. Vaikuntanathan. (leveled) fully homomorphic encryption without boot-strapping. ACM Transactions on Computation Theory, 6(3):13, 2014.
A. Costache, N. P. Smart, S. Vivek, and A. Waller. Fixed-point arithmetic in SHE schemes. In SAC, vol. 10532 of Lecture Notes in Computer Science, pp. 401-422. Springer, 2016.
J. L. H. Crawford, C. Gentry, S. Halevi, D. Platt, and V. Shoup. Doing real work with FHE: the case of logistic regression. IACR Cryptology ePrint Archive, 2018:202, 2018.
C. Gentry. Fully homomorphic encryption using ideal lattices. In Proceedings of the 41st ACM Symposium on Theory of Computing—STOC 2009, pp. 169-178. ACM, 2009.
C. Gentry, S. Halevi, C. S. Jutla, and M. Raykova. Private database access with he-over-oram architecture. In ACNS, vol. 9092 of Lecture Notes in Computer Science, pp. 172-191. Springer, 2015.
C. Gentry, A. Sahai, and B. Waters. Homomorphic encryption from learning with errors: Conceptually-simpler, asymptotically-faster, attribute-based. In R. Canetti and J. A. Garay, editors, Advances in Cryptology—CRYPTO 2013, Part I, pp. 75-92. Springer, 2013.
R. Gilad-Bachrach, N. Dowlin, K. Laine, K. E. Lauter, M. Naehrig, and J. Wernsing. Cryptonets: Applying neural networks to encrypted data with high throughput and accuracy. In ICML, vol. 48 of JMLR Workshop and Conference Proceedings, pp. 201-210. JMLR.org, 2016.
Z. G. T. Gu and S. Garg. Safetynets: Verifiable execution of deep neural networks on an untrusted cloud. In Advances in Neural Information Processing Systems, NIPS '17, 2017.
S. Halevi and V. Shoup. HElib—An Implementation of homomorphic encryption. https://github. com/shaih/HElib/, Accessed Sep. 2014.
A. Khedr, P. G. Gulak, and V. Vaikuntanathan. SHIELD: scalable homomorphic implementation of encrypted data-classifiers. IEEE Trans. Computers, 65(9):2848-2858, 2016.

A. Kim, Y. Song, M. Kim, K. Lee, and J. H. Cheon. Logistic regression model training based on the approximate homomorphic encryption. Cryptology ePrint Archive, Report 2018/254, 2018. https://eprint.iacr.org/2018/254.
M. Kim, Y. Song, S. Wang, Y. Xia, and X. Jiang. Secure logistic regression based on homomorphic encryption: Design and evaluation. JMIR Med Inform, 6(2):e19, Apr. 2018. available from https://ia.cr/2018/074.
Y. LeCun, L. Bottou, Y. Bengio, and P. Haffner. Gradient-based learning applied to document recognition. Proceedings of the IEEE, 86(11):2278-2324, 1998.
Y. Lindell and B. Pinkas. Privacy preserving data mining. J. Cryptology, 15(3):177-206, 2002.
J. Liu, M. Juuti, Y. Lu, and N. Asokan. Oblivious neural network predictions via minionn transformations. In B. M. Thuraisingham, D. Evans, T. Malkin, and D. Xu, editors, Proceedings of the 2017 ACM SIGSAC Conference on Computer and Communications Security, CCS 2017, Dallas, TX, USA, Oct. 30-Nov. 3, 2017, pp. 619-631. ACM, 2017.
P. Mohassel and Y. Zhang. Secureml: A system for scalable privacy-preserving machine learning. In 2017 IEEE Symposium on Security and Privacy, SP 2017, San Jose, CA, USA, May 22-26, 2017, pp. 19-38. IEEE Computer Society, 2017.
V. Nikolaenko, U. Weinsberg, S. Ioannidis, M. Joye, D. Boneh, and N. Taft. Privacy-preserving ridge regression on hundreds of millions of records. In Security and Privacy (SP), 2013 IEEE Symposium on, pp. 334-348. IEEE, 2013.
C. Orlandi, A. Piva, and M. Barni. Oblivious neural network computing via homomorphic encryption. EURASIP J. Information Security, 2007, 2007.
M. S. Riazi, C. Weinert, O. Tkachenko, E. M. Songhori, T. Schneider, and F. Koushanfar. Chameleon: A hybrid secure computation framework for machine learning applications. In 13 ACM Asia Conference on Information, Computer and Communications Security (ASIACCS'18). ACM, Jun. 4-8, 2018. To appear. Preliminary version: http://ia.cr/2017/1164.
C. J. V. Vaikuntanathan and A. Chandrakasan. GAZELLE: a low latency framework for secure neural network inference. In arXiv preprint, 2018.
S. Wang, Y. Zhang, W. Dai, K. Lauter, M. Kim, Y. Tang, H. Xiong, and X. Jiang. Healer: homomorphic computation of exact logistic regression for secure rare disease variants analysis in gwas. Bioinformatics, 32(2):211-218, 2016.
M. Zinkevich, M. Weimer, L. Li, and A. J. Smola. Parallelized stochastic gradient descent. 2010.
Hitaj, Briland, Giuseppe Ateniese, and Fernando Pérez-Cruz. "Deep models under the GAN: information leakage from collaborative deep learning." Proceedings of the 2017 ACM SIGSAC Conference on Computer and Communications. Security. ACM, 2017.
Makri, Eleftheria, et al. PICS: Private Image Classification with SVM. IACR Cryptology ePrint Archive 2017/1190, 2017.
Hardy, Stephen, et al. "Private federated learning on vertically partitioned data via entity resolution and additively homomorphic encryption." arXiv preprint arXiv:1711.10677 (2017).

* cited by examiner

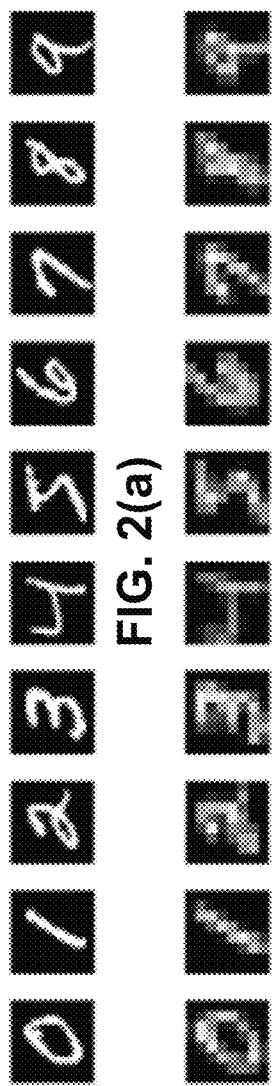
FIG. 2(a)
FIG. 2(b)
FIG. 2
FIG. 3

LEARNING AND INFERRING INSIGHTS FROM ENCRYPTED DATA

BACKGROUND

This invention relates generally to model building using, e.g., artificial intelligence models, and encryption and, more specifically, relates to using both model building and homomorphic encryption operations to perform learning and inferring insights from encrypted data.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

Advances in machine learning and its efficacy are increasingly being adopted by a wide variety of industries and applications. There are emerging businesses organized around providing services for the following:

1) Training: learning insights from domain specific "training" data samples from the end-users to develop and learn models capable of predicting insights from new data; and
2) Inference: Given learnt models and new data, inferring insights from the new data.

Since the data is new and a critical asset, the end users would prefer not to share the data, which may be proprietary, and disclosure of the data could impact any competitive advantage held by the end users. Additionally, the data may be sensitive, and the end users therefore would desire privacy for the data. The service providers that could provide inferences using the data from the end users have their own concerns. One such concern is contamination: Since the data can be confidential, the service providers do not want to be exposed to the data or be responsible for abetting insights that may be illegitimate.

Consider the following scenario. The end user has data (e.g., health records) that cannot be shared on the cloud, for instance due to privacy concerns. Meanwhile, a deep-learning service provider cannot share its network, e.g., with the user, while at the same time promising good accuracy performance for inferencing. These are concerns with no clear solutions.

SUMMARY

This section is meant to be exemplary and not meant to be limiting.

In an exemplary embodiment, a method is disclosed. The method includes receiving by a computer system a set of data encrypted by a homomorphic encryption transformation. The method includes performing by the computer system machine learning operations using the encrypted set of data, wherein the machine learning operations build, using homomorphic operations, a trained model of the data having a mapping between the encrypted data and output of the trained model. The method also includes storing by the computer system the model for use for performing inferencing of other encrypted data to determine a corresponding output of the trained model.

In another exemplary embodiment, a computer system is disclosed. The computer system comprises memory storing computer program code and one or more processors. The one or more processors, in response to retrieval and execution of the computer program code, cause the computer system to perform operations. Those operations include receiving by the computer system a set of data encrypted by a homomorphic encryption transformation. The operations comprise performing by the computer system machine learning operations using the encrypted set of data, wherein the machine learning operations build, using homomorphic operations, a trained model of the data having a mapping between the encrypted data and output of the trained model. The operations further include storing by the computer system the model for use for performing inferencing of other encrypted data to determine a corresponding output of the trained model.

A further exemplary embodiment is a computer program product comprising a computer readable storage medium having program instructions embodied therewith. The program instructions are executable by a computer system to cause the computer system to perform operations comprising: receiving by a computer system a set of data encrypted by a homomorphic encryption transformation; performing by the computer system machine learning operations using the encrypted set of data, wherein the machine learning operations build, using homomorphic operations, a trained model of the data having a mapping between the encrypted data and output of the trained model; and storing by the computer system the model for use for performing inferencing of other encrypted data to determine a corresponding output of the trained model.

An additional exemplary embodiment is a method. The method includes encrypting by a computer system a set of data using a homomorphic encryption transformation, and sending by the computer system the set of data toward another computer system for use by the other computer system to create a model of the data having a mapping between the encrypted data and output of the model. The method includes encrypting by the computer system other data. The method further includes causing use of the model to infer a label in an encrypted format, the label corresponding to the encrypted other data, and decrypting the label to create a decrypted label. The decrypted label is a classification label that classifies the other data as one of multiple classes.

In another exemplary embodiment, a computer system is disclosed. The computer system comprises memory storing computer program code and one or more processors. The one or more processors, in response to retrieval and execution of the computer program code, cause the computer system to perform operations. Those operations include encrypting by the computer system a set of data using a homomorphic encryption transformation and sending by the computer system the set of data toward an other computer system for use by the other computer system to create a model of the data having a mapping between the encrypted data and output of the model. The operations additionally comprise encrypting by the computer system other data and causing use of the model to infer a label in an encrypted format, the label corresponding to the encrypted other data. The operations also include decrypting the label to create a decrypted label, the decrypted label being a classification label that classifies the other data as one of multiple classes.

A further exemplary embodiment is a computer program product comprising a computer readable storage medium having program instructions embodied therewith. The program instructions are executable by a computer system to cause the computer system to perform operations comprising: encrypting by a computer system a set of data using a homomorphic encryption transformation; sending by the computer system the set of data toward an other computer system for use by the other computer system to create a model of the data having a mapping between the encrypted data and output of the model; encrypting by the computer system other data; causing use of the model to infer a label in an encrypted format, the label corresponding to the encrypted other data; and decrypting the label to create a decrypted label, the decrypted label being a classification label that classifies the other data as one of multiple classes.

BRIEF DESCRIPTION OF THE SEVERAL VIEWS OF THE DRAWINGS

FIG. 2 illustrates samples from the MNIST training dataset as follows: FIG. 2(a) illustrates a (28×28) pixel representation before any preprocessing, and FIG. 2(b) illustrates an (8×8) pixel representation after cropping and rescaling;

FIG. 3 illustrates a 3-layer fully connected network with a sigmoid activation function;

DETAILED DESCRIPTION

Figure 1:
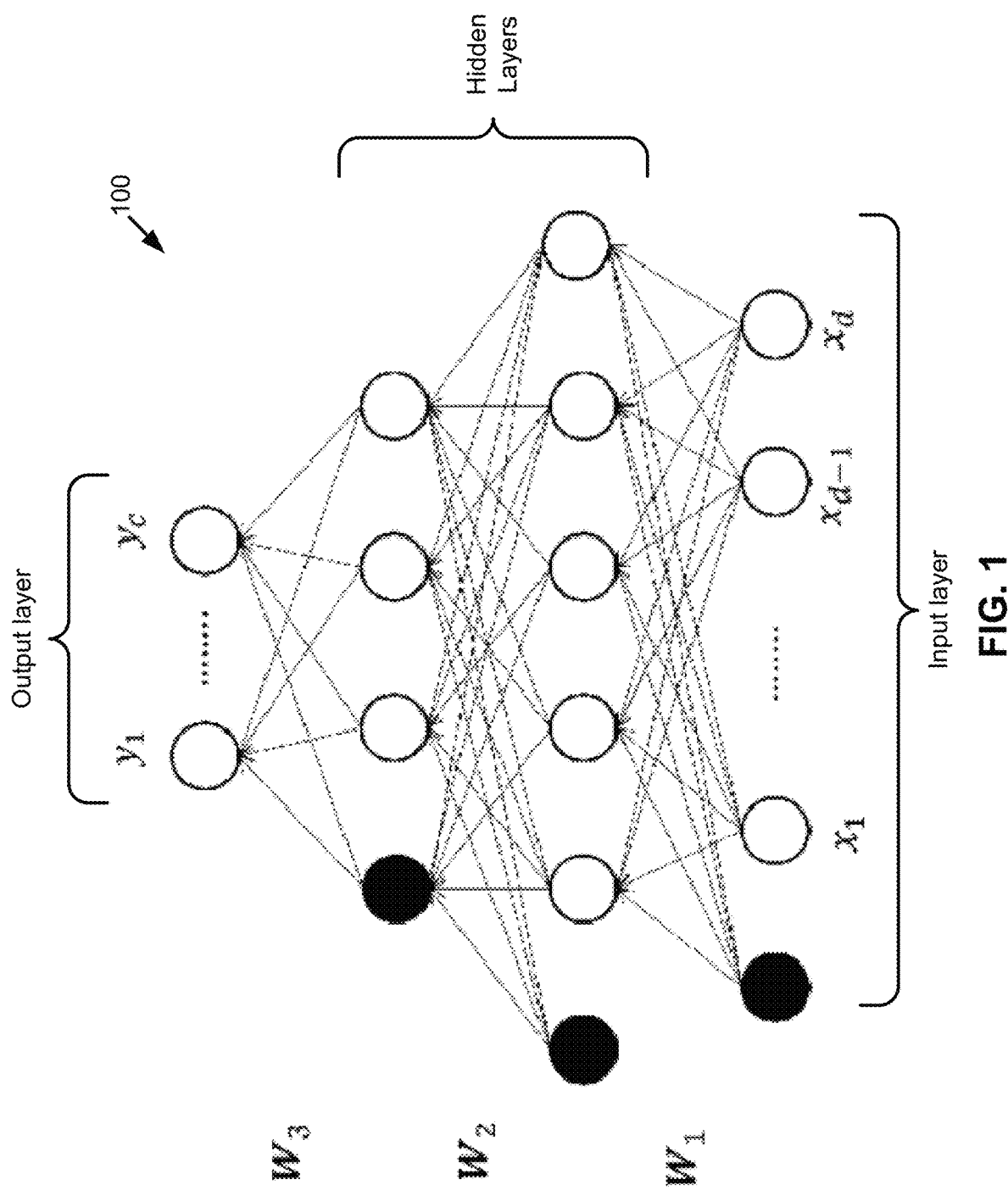
FIG. 1 illustrates an exemplary neural network with two hidden layers.

The following abbreviations that may be found in the specification and/or the drawing figures are defined as follows:
% percent
AI artificial intelligence
DNN deep neural network
FHE fully homomorphic encryption
I/F interface
MNIST modified national institute of standards and technology
NIT network for inferencing and training
NN neural network
N/W network
Rx receiver
SGD stochastic gradient descent
Tx transmitter The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The instant examples provided herein concern techniques for learning and inferring insights from encrypted data. These techniques may be used to address concerns such as where an end user has data that cannot be shared on the cloud, and by contrast a service provider cannot share its network with the user while at the same time promising good accuracy performance.

The instant examples use an underlying system referred to herein as the Fully Homomorphic Encryption based Network for Inferencing and Training (FHE-NIT). The first part of this document (the Prologue and Sections 1 to 4) describes the FHE-NIT system and its technological bases. The second part of this document (Section 5) describes in more detail exemplary embodiments that use the FHE-NIT system.

Prologue. Background to and Overview of the FHE-NIT System

Deep learning is an extremely valuable tool in solving tough problems in many core technology areas including text, speech, language, dialogue and vision. The three critical factors that typically determine the success of deep learning models are: (i) availability of sufficient training data, (ii) access to extensive computational resources, and (iii) expertise in selecting the right model and hyperparameters (parameters whose values are set before the learning process begins) for the selected task.

In many cases, the availability of data is the hard part, since data that could have been used in training cannot be shared due to compliance, legal, and privacy reasons. Cryptographic techniques such as fully homomorphic encryption (FHE) offer a potential solution to the above conundrum. FHE allows processing of encrypted data, making the data and computations "invisible" even as they are used. While some prior work was done on using homomorphic encryption for inferencing, training a deep neural network in the encrypted domain is an extremely challenging task due to the computational complexity of the operations involved.

In this part, we demonstrate for the first time the plausibility of training on encrypted data. An exemplary proposed system, which we call Fully Homomorphic Encryption based Network for Inferencing and Training (FHE-NIT), may use the open-source FHE toolkit HElib to implement a Stochastic Gradient Descent (SGD)-based training of a neural network, and allows inferencing by querying the encrypted model. To enable encrypted training, the network has to undergo significant changes to minimize the degradation in the underlying accuracy. We also study the impact of data representation and resolution on the FHE-NIT. Finally, we explore the efficient distribution of operations over multiple computing nodes to speed up the training process.

A key advantage of FHE-NIT is that it is completely non-interactive, which prevents leakage of any sensitive information during training or inferencing. We demonstrate the feasibility of our end-to-end solution in the context of MNIST dataset and suggest ways to reduce training time and enhance accuracy. While the cost of training a complex deep learning model from scratch may be very high, we demonstrate that at least in some settings, it is not astronomical. Moreover, the proposed approach could be used for tasks such as transfer learning as well as fine-tuning of deep learning models.

1. INTRODUCTION

Deep neural networks (DNNs) are powerful tools with a wide range of applications, from speech to vision and much more. Solutions that use deep neural networks consist of two main phases, namely training and inference: After appropriate datasets are identified and curated, a network architecture is established, and then the identified corpus of data is used to train it, i.e., to learn the weights for the network. Once the network weights are stable and provide meaningful results for the application at hand, the network can be used for inferencing, where the network renders predictions on new data. While the training time may run into days, inferencing is expected to be fast.

There are many scenarios where the data needed for training is sensitive, such as when it belongs to some organization but cannot be shared outside. For example, credit card transaction information is available with the credit card company but not for an ordinary user. Similarly healthcare data related to patients is available in a hospital but not for a researcher to find patterns in the data for understanding cancer progression. Moreover, privacy concerns (such as the new European data privacy regulation GDPR) may restrict the availability of data. Similar situations arise where competitors would like to pull their data to build accurate models (such as different banks having data relating to the transactions and wanting to build fraud detection models). Restricting the availability of data may prevent otherwise useful models from being used, or degrade their performance.

Cryptographic techniques for computing on encrypted data offer an appealing approach for resolving the tension between usefulness and sensitivity of data. However, the current common wisdom is that such techniques are too slow to handle the training of common models. In this work, we propose using Fully Homomorphic Encryption (FHE) to address this tension. The original proposal of fully-homomorphic encryption (FHE) was touted as a revolutionary technology [8], with potential far-reaching implications to cloud computing and beyond. Though only a theoretical plausibility result at first, the last decade saw major algorithmic improvements (e.g., [4, 5, 10]), resulting in many research prototypes that implement this technology and attempt to use it in different settings (e.g., [3, 9, 14, 6, 11, 16], among others).

Training the model on encrypted data would enable users to provide their data to the service provider in encrypted form, and the provider can train the model without ever seeing the underlying data. The resulting model will also be encrypted, and so using it would require access to the secret key. That is, because the underlying data is encrypted, then the model itself is encrypted, because the weights are all encrypted and the actual values of these cannot be determined without decrypting them. Anyone wanted to employ the actual model itself would require access to the secret key, to which only a specific client has access. This makes it possible to implement flexible systems, where control of both data and model is handled via key-management, making it possible to adjust it to business and regulatory considerations.

Perhaps surprisingly, we provide evidence that in some settings, the FHE-NIT system may be fast enough to support even the demanding training phase of deep networks, in certain situations. To the best of our knowledge, this is the first disclosure to demonstrate that fully homomorphic encryption can be used not just for inferencing but also for training. The design approach presented in this paper demonstrates the feasibility of FHE to protect privacy and data security while learning a model and corresponding network.

1.1 Related Work

While privacy-preserving machine learning has been studied for nearly twenty years [18, 1], not much work was done on specifically using homomorphic implementation for neural networks. The only prior work that we found using non-interactive homomorphic encryption for neural networks is the Crypto-Nets work of Gilad-Bachrach et al. [1]. That work demonstrated a carefully-designed neural network that that can run the inference phase on encrypted data, with 99% accuracy on the MNIST optical character recognition tasks, achieving amortized rate of almost 60,000 predictions/hour.

There has been more work about using homomorphic encryption in conjunction with interactive secure-computation protocols in the context of neural networks. An early work along these lines is due to Barni et al. and Orlandi et al. [2, 22], that combined additively-homomorphic encryption with an interactive protocol, and were able to run the inference part of a small network in about ten seconds. Many more interactive protocols for the inference phase were suggested recently, including SecureML of Mohassel and Zhang [20], MiniONN of Liu et al. [19], Chameleon of Riazi et al. [23], and GAZEELE of Juvekar et al. [24]. The last of these can perform the inference phase of MNIST as fast as 30 ms, and the CIFAR-10 benchmark in just 13 seconds.

All these works address only the inference phase of using the network, none of them addresses the training phase. In fact we were not able to find any prior work that deals with private training of neural networks. Presumably, this is due to the perception that trying to train homomorphically will be so slow as to render it unusable. In the current work we take the first step toward dispelling this perception, showing that even non-interactive homomorphic encryption can be used for training, in some cases.

Some prior work described how to preform training and inference for other types of models on encrypted data, specifically linear-regression models [21] and even logistic-regression models [25, 12, 16, 15, 7].

2. PROPOSED EXEMPLARY SOLUTIONS FOR THE FHE-NIT SYSTEM

In this section, we describe the deep learning model and the components of the solution needed to achieve full homomorphic encryption for learning and inference used for the FHE-NIT system.

2.1 Deep Learning Model

In this part, we primarily focus on supervised deep learning, where the broad objective is to learn a non-linear mapping between the inputs (training samples) and the outputs (e.g., class labels of the training samples). Deep learning models are typically implemented as multi-layer neural networks, which allows higher-level abstract features to be computed as non-linear functions of lower-level features (starting with the raw data). FIG. 1 shows an exemplary neural network (NN) 100 with two hidden layers. The NN 100 is a deep neural network (DNN), which is typically defined as a NN with multiple hidden layers. Here, the black circles denote bias nodes that always emit a value of 1 (one). There is an input layer with inputs of $x_1 \ldots, x_{d-1}, x_d$ and an output layer of $y_1 \ldots y_c$. Weight matrices $W_l$ (see $W_1$, $W_2$, and $W_3$) determine the contribution of each input signal to the activation function at a node. The output of each node (where a node is also known as a neuron) in the network is computed by applying a non-linear activation function to the weighted average of its inputs, which includes a bias term that always emits value 1. The output vector of neurons in layer l (l=1, 2, . . . , L) is obtained as:

$$a_l = f(W_l a_{l-1}), \qquad (1)$$

where $f$ is the activation function, $W_l$ is the weight matrix of layer l, and L is the total number of layers in the network.

Given the training data $\{x_i, y_i\}_{i=1}^{N}$, the goal is to learn the parameters (e.g., weight matrices) in order to minimize a pre-defined loss function L. This is a non-linear optimization problem, which is typically solved using variants of gradient descent. Gradient descent starts with a random set of parameters, computes the gradient of the loss function L at each step, and updates the parameters so as to decrease the gradient. In this work, we use the well-known stochastic gradient descent (SGD) algorithm [26], where the gradients are averaged over a small (randomly sampled without replacement) subset (mini-batch) of the whole training dataset. One full iteration over the entire training set is referred to as the epoch. The above gradient update step is repeated until convergence to a local optimum or until the maximum number of epochs is reached. The update rule for SGD for weight matrix $W_l$ is the following:

$$W_l := W_l - \alpha \frac{\partial L_B}{\partial W_l}, \quad (2)$$

where $L_B$ is the loss function computed over the mini-batch B and $\alpha$ is the learning rate. The error or loss value at the output layer is computed based on the forward pass, while backpropagation is used to propagate this error back through the network.

2.2 Homomorphic Implementation of Deep Learning

We use the open-source fully homomorphic encryption library called HElib [13] as our primary toolkit to implement the model learning procedure. Devising a homomorphic computation of this procedure brings up many challenges. Here we briefly discuss some of them.

2.2.1 Implementing the Basic Homomorphic Operation

Most of the operations in model learning are linear, involving additions and multiplications. The current version of HElib that we use supports addition and multiplication operations of arbitrary numbers in binary representation, using encryption of the individual bits. This means that we use the underlying homomorphic encryption scheme with native plaintext space modulo 2, which we use to encrypt the bits of the input.

Two key steps in the algorithm require computing "complex" functions (such as exponentiation, etc.). These two steps are (i) computation of the activation function $f$ and its derivative, and (ii) computation of the loss function L and its derivative. The "natural" approaches for computing these functions homomorphically, are either to approximate them by low-degree polynomials (e.g., using their Taylor expansion), or by pre-computing them in a table and performing homomorphic table lookup. Namely, for a function $f$ that we need to compute, we pre-compute (in the clear) a table $T_f$ such that $T_f[x]=f(x)$ for every x in some range. Subsequently, given the encryptions of the (bits of) x, we perform homomorphic table lookup to get the (bits of) value $T_f[x]$. Following Crawford et al. [7], we adopt the second approach here. This is faster and shallower when it is applicable, but it can only be used to get a low-precision approximation of these functions. In order to avoid the use of too many table lookups, we will use sigmoid activation function and quadratic loss function, which have simpler derivatives.

2.2.2 Parameters and Bootstrapping

We adopted the parameter setting used in [7], which means that the "production version" of our solution uses the cyclotomic ring $Z[X]/\Phi_m(X))$, with $m=2^{15}-1$, corresponding to lattices of dimension $\phi(m)=27000$. This native plaintext space yields 1800 plaintext slots, each holding a bit. (Each slot can actually hold an element of $GF(2^{15})$, but we only use the slots to hold bits in our implementation). The other parameters are chosen so as to get security level of about 80 bits, and this parameter setting allows bootstrapping, so we can evaluate the deep circuits that are required for training.

Most of our development and testing was done on a toy setting of parameters, with $m=2^{10}-1$ (corresponding to lattices of dimension $\phi(m)=600$). For that setting we have only 60 plaintext slots per ciphertext (each capable of holding an element of $GF(2^{10})$, but only used to hold a single bit).

2.3 Data Representation and Encoding

All the operations in the proposed solution are applied to integers in binary representation (i.e., using encryption of the individual bits).

2.3.1 Input & Output:

We use 8-bit signed integer representation for the inputs to the network. The outputs of the network are the weight matrices and each element in the weight matrix is represented as a 16-bit signed integer. To deal with negative integers, we use the 2s-complement representation wherever necessary.

2.3.2 Ciphertext Packing:

We set the mini-batch size during training to be the same as the number of slots in the plaintext space. Note that for our final implementation, $m=2^{15}-1$ and the number of slots is 1800. The ciphertexts are represented as 2-dimensional arrays, i.e., encryptedInput[i][0] contains the encryption of the least significant bits of all the 1800 numbers in the i-th dimension of the input. Similarly, encryptedInput[i][7] contains the encryptions of the most significant bits.

2.3.3 Matrix Multiplication:

One of the critical and time-consuming operations in the encrypted domain, especially in the context of mini-batch SGD, is matrix multiplication. Since computation of dot products is not straightforward due to the way in which the inputs are packed in a ciphertext, we adopt the following simple approach for matrix multiplication in the encrypted domain. Suppose $A=[a_{ij}]$ and $B=[b_{jk}]$ are two matrices, where $i=1, \ldots, d_i$, $j=1, \ldots, d_j$ and $k=1, \ldots, d_k$. Let $C=[c_{ik}]$ be the product of A and B. Then, $$c_{i\cdot} = \sum_{j=1}^{d_j} \alpha_{ij} b_{j\cdot}, \quad (3)$$

where $c_{i\cdot}$ is a ciphertext packing all the elements in the $i^{th}$ row of C, $\alpha_{ij}$ is a ciphertext containing the encryption of value $a_{ij}$ in all the slots, and $b_{j\cdot}$ is a ciphertext packing all the elements in the $j^{th}$ row of B. Thus, each matrix multiplication involves $d_i \times d_j$ ciphertext multiplications.

3. RESULTS

In this section, we describe the dataset used in our experiment as well as the results in terms of accuracy and timing.

3.1 Dataset and Neural Network Parameter Selection

We conduct experiments on the standard MNIST benchmark dataset [17] for handwritten digit recognition consisting of 60,000 training examples and 10,000 test examples.

Each example is a 28×28 gray-level image, with digits located at the center of the image. See FIG. 2, which illustrates samples from the MNIST training dataset as follows: FIG. 2(a) illustrates (28×28) pixel representation before any preprocessing; and FIG. 2(b) illustrates (8×8) pixel representation after cropping and rescaling (displayed with a similar size as the top row for comparison). The architecture of the neural network used in this part of the disclosure is shown in FIG. 3, which is a 3-layer fully connected network with sigmoid activation function. More specifically, FIG. 3 illustrates a neural network architecture (NN2) used for MNIST dataset with 64 inputs. FIG. 3 is a representation (e.g., in pseudo-code) of a 4-layer DNN, with (1) as the input layer, (2)+(3) as a first hidden layer, (4)+(5) as a second hidden layer, and (6)+(7) as the output layer. There are 64 input nodes in the input layer and 10 output nodes in the output layer.

Cropping of boundary pixels and rescaling using bicubic interpolation are used to reduce the original MNIST images to (8×8) pixels. The cropping and rescaling operations are performed in the plaintext domain and the 64 inputs are then encrypted using the FHE scheme. We normalize all the samples (both training and test) by subtracting the average and dividing by the standard deviation of training samples. This normalized image is finally vectorized to obtain a $d_0$-dimensional representation, which forms the input to the neural network, i.e., $x_i \in \mathbb{R}^{d_0}$.

Since the objective is to classify the input as one of 10 possible digits within ["0"-"9"], we set the size of the output layer as 10. The desired output is represented as a 10-dimensional vector $y_i=[y_{i,0}, \ldots, y_{i,9}]$, with value $y_{i,j}=1$ if the sample belongs to $j^{th}$ class and 0 otherwise. We use a quadratic loss function at the output during training, i.e., $L=(\|a_L-y_i\|^2)/2$. During inferencing, the input sample is assigned to the class whose corresponding neuron has the highest activation.

We consider two different sets of parameters for the above 3-layer neural network. Firstly, we present the full 784-dimensional (28×28) input to the neural network (denoted as NN1), which contained 128 and 32 neurons in the two hidden layers. Consequently, the number of parameters to be learned is 104,938 (=(128×785)+(32×129)+(10×33)). Since learning such a large number of parameters is currently beyond the reach of most FHE schemes, we also consider a much smaller network (denoted as NN2) with $d_0=64$, and containing 32 and 16 neurons in the two hidden layers (see FIG. 2). This is achieved by cropping only the central 24×24 pixels of each image and rescaling the image by a factor of (⅓) using bicubic interpolation to obtain a 8×8 pixel representation. FIG. 2 shows some examples of the raw and processed MNIST images. For the latter network, the number of parameters to be learned is only 2,778, computed by the following: (=(32×65)+(16×33)+(10×17)).

The weights of the network are randomly initialized by sampling from a Gaussian distribution with zero mean and a standard deviation of 0.1. Though quadratic loss function and sigmoid activation function may not be optimal choices for the selected application, we nevertheless employ them to avoid the need for complex table lookups during backpropagation. Note that the sigmoid activation function is given by $f(z)=(1+\exp(-z))^{-1}$ and its derivative can be easily computed as $f'(z)=f(z)(1-f(z))$, without the need for any rational divisions. Similarly, the derivative of the quadratic loss function is simply $(a_L-y_i)$. Thus, the entire training process requires the computation of only one complex function, namely, the sigmoid function, which is implemented as an 8-bit table lookup as described in Section 2.2.

3.2 Classification Accuracy

Figures 4, 5:
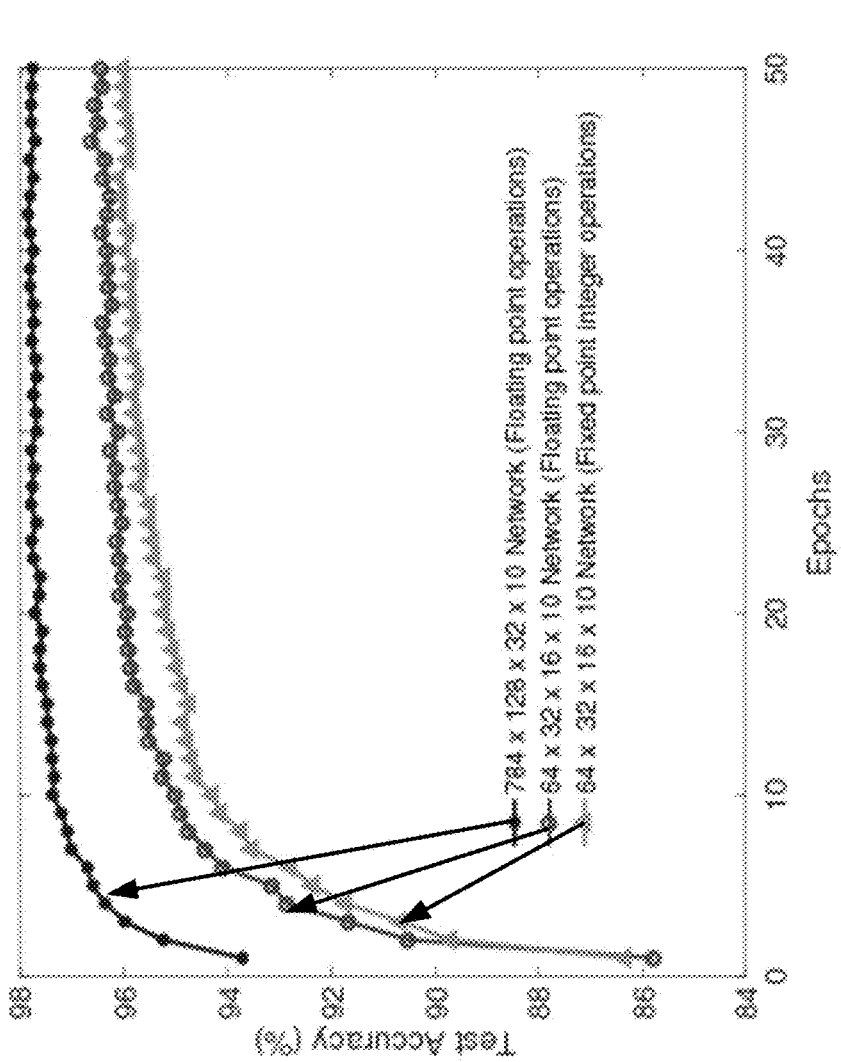
FIG. 4 is a graph illustrating classification accuracy of proposed neural networks on the MNIST (modified national institute of standards and technology) test dataset.
FIG. 5 is a table (Table 1) illustrating the time taken (in seconds) to process one neuron at a first layer of a neural network.

Both the networks (NN1 and NN2) described in the previous section are trained using mini-batch SGD with a batch size of 60 samples. When these networks are trained for 50 epochs using full floating point operations, they achieve an overall classification accuracy of 97.8% (for NN1) and 96.4% (for NN2). The evolution of test accuracy over multiple epochs is shown in FIG. 4. This shows that reasonable classification accuracy can be achieved on the MNIST dataset with a much fewer number of parameters.

Next, to estimate the classification accuracy of the proposed FHE-NIT solution, we quantize all the values into fixed-point signed integers. As described earlier, 8-bit representations are used for all the input and loss values, while 16-bit representations are used for the weights and gradients. It can be observed from FIG. 4 that the above quantized network (trained in the plaintext domain) can achieve a classification accuracy of 96%. Finally, we verify the gradient computations in the encrypted domain for a single mini-batch of data. Using the exact same weight initializations and sample set in both the plaintext and encrypted domains, we confirmed that the computations performed in both the domains are identical. Thus, it can be claimed that the classification accuracy of the model learned using homomorphically encrypted data will be the same as that of the quantized version of NN2, which is 96%.

3.3 Computational Complexity

Testing of encrypted domain processing was done on an Intel Xeon E5-2698 v3 (which is a Haswell processor), with two sockets and sixteen cores per socket, running at 2.30 GHz. The machine has 250 GB of main memory, the compiler was GCC version 7.2.1, and we used NTL version 10.5.0 and GnuMP version 6.0.

We primarily worked with the cyclotomic ring $Z[X]/\Phi_m(X)$ with $m=2^{10}-1=1023$ (so $\phi(m)=600$) for most of the development tasks. Since these parameters do not provide sufficient security, we also attempted to compare the time complexity when $m=2^{15}-1=32767$ (so $\phi(m)=27000$), which corresponds to about 80 bits of security.

3.3.1 Single-Threaded Timing:

For m=1023, a single thread execution of one mini-batch of size 60 training samples, required approximately 9 hours and 24 minutes. Almost 80% of this time is consumed by the three matrix multiplication tasks, namely, computation of the weight average input to a layer (requires multiplication of the input to a layer with its corresponding weight matrix), loss propagation to the previous layer (requires multiplication of the loss at the previous layer with the weight matrix), and the gradient computation. One complete mini-batch requires 6 bootstrapping operations (one after each layer during both the forward pass and backpropagation).

It was also observed that when m=32767, almost all the operations slowed down by approximately 40-60 times on a single threaded machine. However, it must be noted that m=32767 can accommodate 1,800 slots as compared to 60 slots for m=1023. Thus, it is possible to compensate for the increased computational complexity by packing more input samples into a single ciphertext and reducing the number of batches to be processed.

3.3.2. Multi-Threaded Timing:

Multi-threading was very effective in reducing the computation time because it is well-known that the weight updates in SGD are independent. In other words, it is possible to process each neuron independently and in parallel. Even within a single neuron, the multiplication operations across multiple input dimensions can be parallelized. From Table 1, illustrated in FIG. 5, it can be observed that by parallelizing computations within a single neuron across multiple threads, it is possible to achieve almost linear speedup. Specifically, with 30 threads we observed about a 15× speed-up, which means that the execution of one mini-batch would take well under an hour for m=1023.

4. REFERENCES

[1] R. Agrawal and R. Srikant. Privacy-preserving data mining. In W. Chen, J. F. Naughton, and P. A. Bernstein, editors, Proceedings of the 2000 ACM SIGMOD International Conference on Management of Data, May 16-18, 2000, Dallas, Tex., USA, pages 439-450. ACM, 2000.

[2] M. Barni, C. Orlandi, and A. Piva. A privacy-preserving protocol for neural-network-based computation. In Proceedings of the 8th Workshop on Multimedia and Security, MM& Sec '06, pages 146-151, New York, N.Y., USA, 2006. ACM.

[3] D. Boneh, C. Gentry, S. Halevi, F. Wang, and D. J. Wu. Private database queries using somewhat homomorphic encryption. In ACNS, volume 7954 of Lecture Notes in Computer Science, pages 102-118. Springer, 2013.

[4] Z. Brakerski. Fully homomorphic encryption without modulus switching from classical gapsvp. In R. Safavi-Naini and R. Canetti, editors, CRYPTO, volume 7417 of Lecture Notes in Computer Science, pages 868-886. Springer, 2012.

[5] Z. Brakerski, C. Gentry, and V. Vaikuntanathan. (leveled) fully homomorphic encryption without bootstrapping. ACM Transactions on Computation Theory, 6(3):13, 2014.

[6] A. Costache, N. P. Smart, S. Vivek, and A. Waller. Fixed-point arithmetic in SHE schemes. In SAC, volume 10532 of Lecture Notes in Computer Science, pages 401-422. Springer, 2016.

[7] J. L. H. Crawford, C. Gentry, S. Halevi, D. Platt, and V. Shoup. Doing real work with FHE: the case of logistic regression. IACR Cryptology ePrint Archive, 2018:202, 2018.

[8] C. Gentry. Fully homomorphic encryption using ideal lattices. In Proceedings of the 41st ACM Symposium on Theory of Computing—STOC 2009, pages 169-178. ACM, 2009.

[9] C. Gentry, S. Halevi, C. S. Jutla, and M. Raykova. Private database access with he-over-oram architecture. In ACNS, volume 9092 of Lecture Notes in Computer Science, pages 172-191. Springer, 2015.

[10] C. Gentry, A. Sahai, and B. Waters. Homomorphic encryption from learning with errors: Conceptually simpler, asymptotically-faster, attribute-based. In R. Canetti and J. A. Garay, editors, Advances in Cryptology—CRYPTO 2013, Part I, pages 75-92. Springer, 2013.

[11] R. Gilad-Bachrach, N. Dowlin, K. Laine, K. E. Lauter, M. Naehrig, and J. Wernsing. Cryptonets: Applying neural networks to encrypted data with high throughput and accuracy. In ICML, volume 48 of JMLR Workshop and Conference Proceedings, pages 201-210. JMLR.org, 2016.

[12] Z. G. T. Gu and S. Garg. Safetynets: Verifiable execution of deep neural networks on an untrusted cloud.

[13] S. Halevi and V. Shoup. HElib—An Implementation of homomorphic encryption. See hyptertext transfer protocol secure at //github.com/shaih/HElib/.

[14] A. Khedr, P. G. Gulak, and V. Vaikuntanathan. SHIELD: scalable homomorphic implementation of encrypted data-classifiers. IEEE Trans. Computers, 65(9):2848-2858, 2016.

[15] A. Kim, Y. Song, M. Kim, K. Lee, and J. H. Cheon. Logistic regression model training based on the approximate homomorphic encryption. Cryptology ePrint Archive, Report 2018/254, 2018. In Advances in Neural Information Processing Systems, NIPS '17, 2017.

[16] M. Kim, Y. Song, S. Wang, Y. Xia, and X. Jiang. Secure logistic regression based on homomorphic encryption: Design and evaluation. JMIR Med Inform, 6(2):e19, April 2018.

[17] Y. LeCun, L. Bottou, Y. Bengio, and P. Haffner. Gradient-based learning applied to document recognition. Proceedings of the IEEE, 86(11):2278-2324, 1998.

[18] Y. Lindell and B. Pinkas. Privacy preserving data mining. J. Cryptology, 15(3):177-206, 2002.

[19] J. Liu, M. Juuti, Y. Lu, and N. Asokan. Oblivious neural network predictions via minionn transformations. In B. M. Thuraisingham, D. Evans, T. Malkin, and D. Xu, editors, Proceedings of the 2017 ACM SIGSAC Conference on Computer and Communications Security, CCS 2017, Dallas, Tex., USA, Oct. 30-Nov. 3, 2017, pages 619-631. ACM, 2017.

[20] P. Mohassel and Y. Zhang. Secureml: A system for scalable privacy-preserving machine learning. In 2017 IEEE Symposium on Security and Privacy, S P 2017, San Jose, Calif., USA, May 22-26, 2017, pages 19-38. IEEE Computer Society, 2017.

[21] V. Nikolaenko, U. Weinsberg, S. Ioannidis, M. Joye, D. Boneh, and N. Taft. Privacy-preserving ridge regression on hundreds of millions of records. In Security and Privacy (SP), 2013 IEEE Symposium on, pages 334-348. IEEE, 2013.

[22] C. Orlandi, A. Piva, and M. Barni. Oblivious neural network computing via homomorphic encryption. EURASIP J. Information Security, 2007, 2007.

[23] M. S. Riazi, C. Weinert, O. Tkachenko, E. M. Songhori, T. Schneider, and F. Koushanfar. Chameleon: A hybrid secure computation framework for machine learning applications. In 13 ACM Asia Conference on Information, Computer and Communications Security (ASIACCS' 18). ACM, Jun. 4-8, 2018.

[24] C. J. V. Vaikuntanathan and A. Chandrakasan. GAZELLE: a low latency framework for secure neural network inference. In arXiv preprint, 2018.

[25] S. Wang, Y. Zhang, W. Dai, K. Lauter, M. Kim, Y. Tang, H. Xiong, and X. Jiang. Healer: homomorphic computation of exact logistic regression for secure rare disease variants analysis in gwas. Bioinformatics, 32(2):211-218, 2016.

[26] M. Zinkevich, M. Weimer, L. Li, and A. J. Smola. Parallelized stochastic gradient descent. 2010.

5. TECHNIQUES FOR LEARNING AND INFERRING INSIGHTS FROM ENCRYPTED DATA

Now that the FHE-NIT system has been described, information corresponding to the current exemplary embodiments is described.

5.1 Introduction and Overview

A brief summary of existing methods of training and inference include the following.

1) The training services are "in the clear", meaning they do not use encrypted data.

2) Either a third-party trust or user-interaction is needed for learning insights from encrypted data.

3) The current techniques rely on a third party/pre-determined feature extraction method.

4) The provider may need to retain the encrypted model to prevent the end-user independently exercising inference.

To address these issues, exemplary embodiments herein provide methods of learning insights from data encrypted by the user. Exemplary implemented embodiments enable machine learning from encrypted data, building directly a model that has the property of being encrypted. The model may then be used, in an inference stage, to operate on encrypted data and to infer an encrypted label. A client may then decrypt the label to determine an "in the clear" label corresponding to the data prior to encryption by the client. Specifically, exemplary methods herein leverage techniques of homomorphic encryption to enable learning and inference within the encrypted domain.

Benefits of the techniques proposed herein comprise one or more of the following:

1) The techniques may work completely without any intervention or intermediate trust; and/or
2) The techniques may enable pay-per-inference model, which can incentivize service providers.

Figure 6:
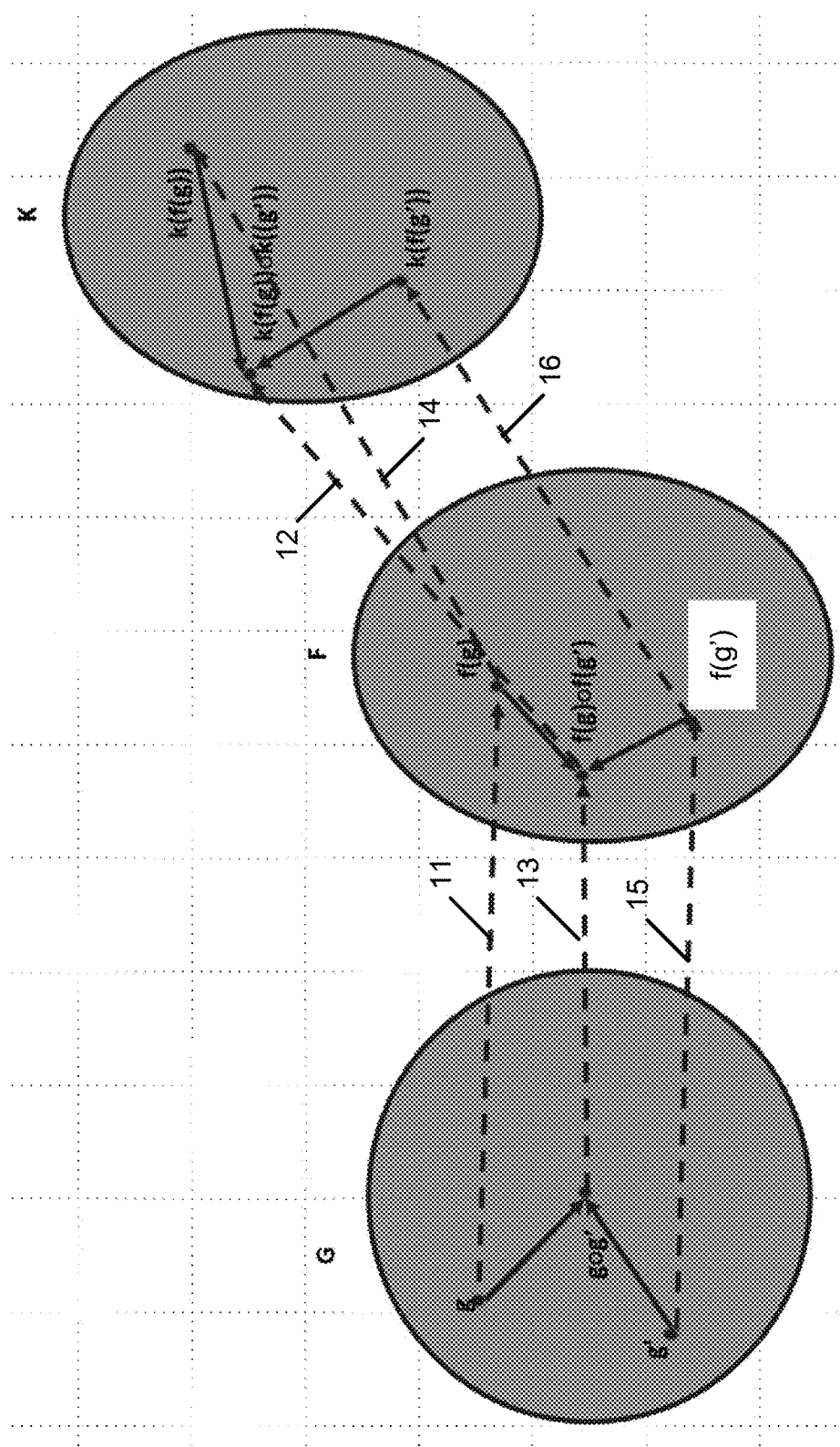
FIG. 6 illustrates homomorphic encryption operations G, F, and K and how these operations preserve relationships among data points operated on by the operations.

One idea that is used herein is that the homomorphic encryption transformation preserves the relationship among the data points under various operations. For instance, FIG. 6 illustrates homomorphic operations G, F, and K and how these operations preserve relationships among data point operated on by the operations. Homomorphic operation G operates on the data points g, g∘g', and g'. Homomorphic operation F operates on the data points $f(g)$, $f(g) \circ f(g')$, and $f(g')$. Homomorphic operation K operates on the data points $k(f(g))$, $k(f(g) \circ k(g'))$, and $k(f(g'))$. The lines 11, 13, and 15 indicate the relationships between g, g∘g', and g' are preserved as this data is operated on from the homomorphic operation G to the homomorphic operation F, ending with data points $f(g)$, $f(g) \circ f(g')$, and $f(g')$. Similarly, the lines 12, 14, and 16 indicate the relationships between $f(g)$, $f(g) \circ f(g')$, and $f(g')$ are preserved as this data is operated on from the homomorphic operation F to the homomorphic operation K, ending with data points $k(f(g))$, $k(f(g) \circ k(g'))$, and $k(f(g'))$.

5.2 Exemplary System

Figure 7:
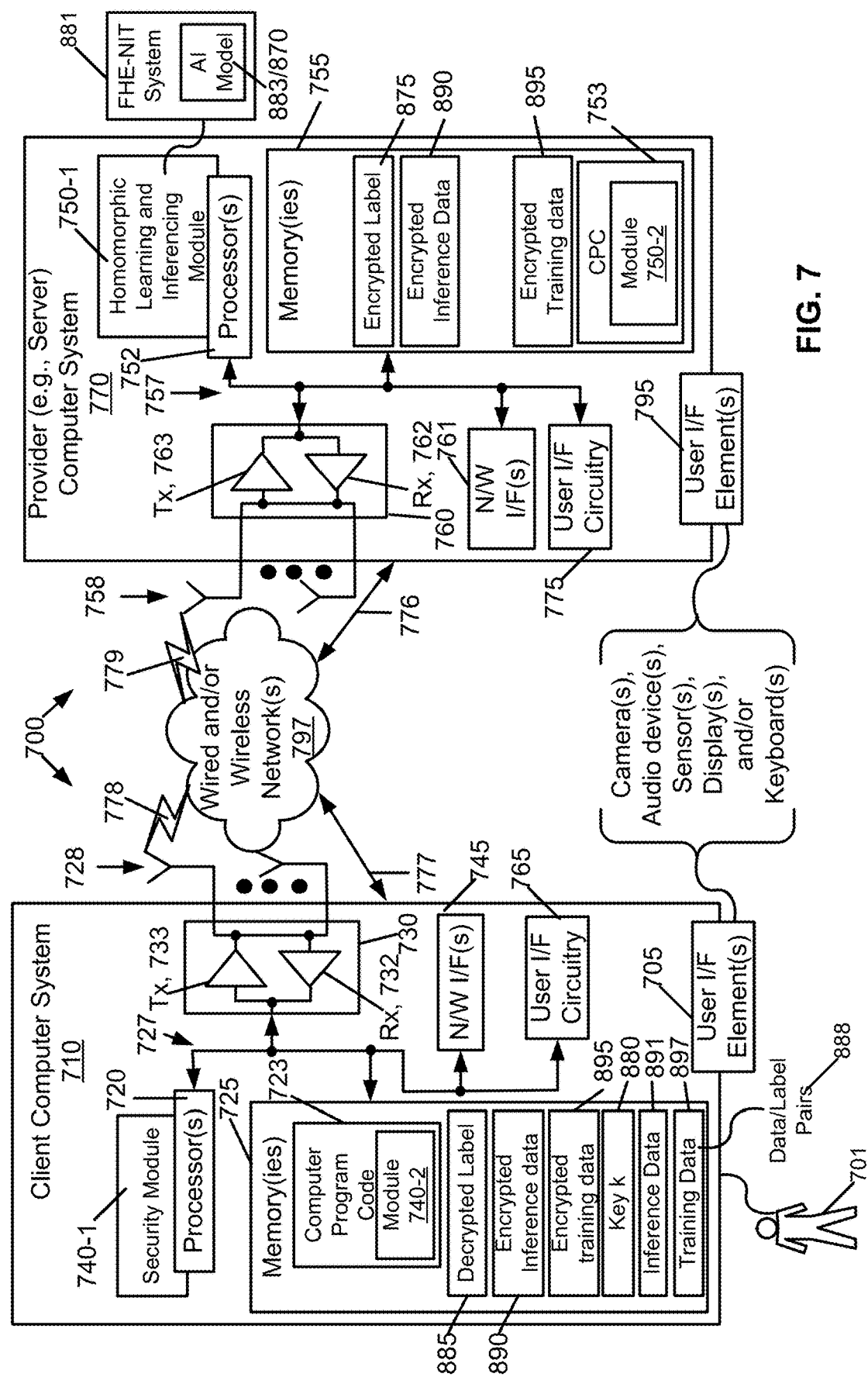
FIG. 7 is a block diagram of an exemplary and non-limiting system in which the exemplary embodiments may be implemented, in accordance with an exemplary embodiment.

Turning to FIG. 7, this figure shows a block diagram of one possible and non-limiting exemplary system 700 in which the exemplary embodiments may be practiced. In FIG. 7, a client computer system 710 is in wired and/or wireless communication with a provider computer system 770. It is assumed the client computer system 710 is a client that accesses the provider computer system 770, e.g., as a server, and therefore the provider computer system 770 will also be referred to herein as a server. However, there does not need to be a client/server relationship between the client computer system 710 and the provider computer system 770.

The client computer system 710 includes one or more processors 720, one or more memories 725, one or more transceivers 730, one or more network (N/W) interfaces (I/F(s)) 745, and user interface circuitry 765, interconnected through one or more buses 727. Each of the one or more transceivers 730 includes a receiver, Rx, 732 and a transmitter, Tx, 733. The one or more buses 727 may be address, data, and/or control buses, and may include any interconnection mechanism, such as a series of lines on a motherboard or integrated circuit, fiber optics or other optical communication equipment, and the like. The one or more transceivers 730 are connected to one or more antennas 728. The one or more memories 725 include computer program code 723, training data 897, inference data 891, a key k 880, encrypted training data 895, encrypted inference data 890, and a decrypted label 885. The training data 897 may include multiple data/label pairs 888. For instance, the data might be an image and the label might be "cat", to indicate the image is of a cat. More detail about these is provided below.

The UE 110 includes a security module 740, comprising one of or both parts 740-1 and/or 740-2, which may be implemented in a number of ways. The security module 740 may be implemented in hardware as security module 740-1, such as being implemented as part of the one or more processors 720. The security module 740-1 may be implemented also as an integrated circuit or through other hardware such as a programmable gate array. In another example, the security module 740 may be implemented as security module 740-2, which is implemented as computer program code 723 and is executed by the one or more processors 720. For instance, the one or more memories 725 and the computer program code 723 may be configured to, with the one or more processors 720, cause the client computer system 710 to perform one or more of the operations as described herein. It should also be noted that the devices shown in the client computer system 710 are not limiting and other, different, or fewer devices may be used.

The user interface circuitry 765 communicates with one or more user interface elements 705, which may be formed integral with the client computer system 710 or be outside the client computer system 710 but coupled to the client computer system 710. The user interface elements 705 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. A user 701 (a human being in this example) interacts with the client computer system 710, e.g., to cause the system 710 to take certain actions such as causing the system 710 to determine a class (as represented by the decrypted label 885) for the inference data 891, or to start a process to train an AI model for inferencing. These operations may also be caused by the client computer system 710, in combination with actions by the user 701 or without actions by the user 701. The client computer system 710 communicates with server computer system 770 via one or more wired or wireless networks 797, via wired links 777 and 778 and wireless links 778 and 779.

The server computer system 770 includes one or more processors 752, one or more memories 755, one or more network interfaces (N/W I/F(s)) 761, one or more transceivers 160, and user interface circuitry 775, interconnected through one or more buses 757. Each of the one or more transceivers 760 includes a receiver, Rx, 762 and a transmitter, Tx, 763. The one or more transceivers 760 are connected to one or more antennas 758. The one or more memories 755 include computer program code 753, encrypted training data 895, encrypted inference data 890, and an encrypted label 875. These are described in more detail below.

The server computer system 770 includes a homomorphic learning and inferencing module 750. The homomorphic learning and inferencing module 750 includes an FHE-NIT system 881, as described above, which includes an AI model 883 and a trained version 870 of the AI model 883. The AI model 883 may be a neural network (NN) such as a deep neural network (DNN), which is typically defined as a NN with multiple hidden layers. The homomorphic learning and inferencing module 770 comprises one of or both parts 750-1 and/or 750-2, which may be implemented in a number of ways.

The homomorphic learning and inferencing module 750 may be implemented in hardware as homomorphic learning and inferencing module 750-1, such as being implemented as part of the one or more processors 752. The homomorphic learning and inferencing module 750-1 may be implemented also as an integrated circuit or through other hardware such as a programmable gate array. In another example, the homomorphic learning and inferencing module 750 may be implemented as homomorphic learning and inferencing module 750-2, which is implemented as computer program code 753 and is executed by the one or more processors 752. For instance, the one or more memories 755 and the computer program code 753 are configured to, with the one or more processors 752, cause the server computer system 770 to perform one or more of the operations as described herein. It should also be noted that the devices shown in the server computer system 770 are not limiting and other, different, or fewer devices may be used.

The one or more buses 757 may be address, data, and/or control buses, and may include any interconnection mechanism, such as a series of lines on a motherboard or integrated circuit, fiber optics or other optical communication equipment, wireless channels, and the like. The user interface circuitry 775 communicates with one or more user interface elements 195, which may be formed integral with the server computer system 770 or be outside the server computer system 170 but coupled to the server computer system 770. The user interface elements 795 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. For instance, the server could be remotely operated and there might not be any user interface element 795.

Now that one possible exemplary system has been described, additional details regarding the exemplary embodiments are described.

5.3 Additional Details

Figure 8:
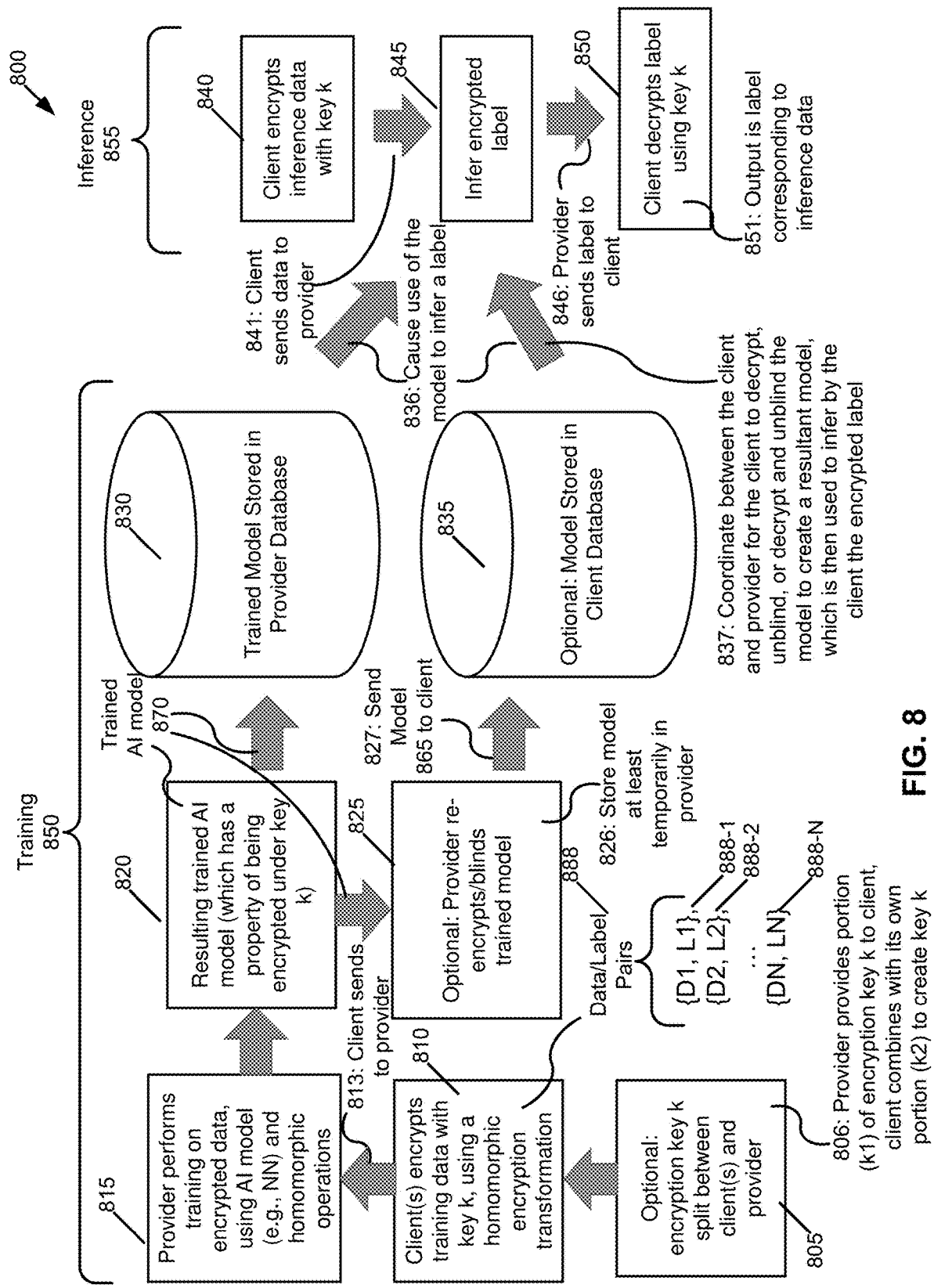
FIG. 8 is a flowchart of an exemplary method for learning and inferring insights from encrypted data, in accordance with an exemplary embodiment.

Referring now to FIG. 8, this figure is a flowchart of an exemplary method 800 for learning and inferring insights from encrypted data, in accordance with an exemplary embodiment. The method 800 is performed by both the client computer system 710, e.g., under control of the security module 740 and the provider computer system 770, e.g., under control of the homomorphic learning and inferencing module 750. FIG. 8 also illustrates a result of execution of computer program instructions embodied on a computer readable memory, functions performed by logic implemented in hardware, and/or interconnected means for performing functions in accordance with exemplary embodiments. For ease of reference, the client computer system 710 will be referred to below as client 710, and the provider computer system 770 will be referred to as a provider 770.

Two phases are shown: a training phase 850; and an inference phase 855. The training phase 850 results in a trained AI model that has been trained using encrypted training data, and the inference phase 855 then uses that trained AI model on encrypted inference data to infer an encrypted label (which can then be decrypted by the client).

The training phase 850 is described first. Blocks 805, 825, and 835 are considered to be optional, and are described below, after the other blocks in the training phase 850 have been described. In block 810, a client 710 encrypts training data 897 with key k 880, using a homomorphic encryption transformation. That is, the client encrypts the training data 897 using a homomorphic transformation that uses the key k 880 as part of the transformation. The training data 897 may include multiple data/label pairs 888, such as the following N data/label pairs: {D1, L1} 888-1, {D2, L2} 888-2, ..., {DN, LN} 888-N. As indicated by reference 813, the client 710 sends the encrypted training data 895 to the provider 770. It is noted the client marks these in the clear, e.g., "This is data", "This is a label for the data", "This is data/label pair #1", or the like. Note also that there may be multiple clients, but for ease of reference and description, only one client is referred to in this description.

In block 815, the provider 770 performs training on encrypted training data 895, using AI model 883 (e.g., a NN such as a DNN) and homomorphic encryption operations. Examples of these training and corresponding homomorphic encryption operations have been described above, in reference to the FHE-NIT system 881, such as in section 2 above. The output of block 815 comprises a trained version 870 of AI model 883. This is illustrated by block 820. In block 830, the trained AI model 870 may be stored by the provider 770 in a provider database, e.g., in memory/memories 775 of the provider 770.

The training of the AI model 883 creates a trained AI model 870. The trained AI model 870 has a property of being encrypted under key k 880. In other words, because the input data is encrypted training data 895, the training is performed on that data, and homomorphic operations are used to perform the training, the model 870 itself has weights (e.g., and other relevant information) that are themselves encrypted based on the homomorphic encryption scheme and corresponding transformation being used. That encryption is also therefore under key k 880. A client (e.g., or other provider or anyone else) not having the key k 880 that wants to use the trained AI model 870 would not be able to use the trained AI model 870 without the key k 880.

Block 805 is optional. In block 805, the encryption key 880 is split between the client 710 and the provider 770. In simple terms, this may be thought of as a double combination to a locker—both parties would have to consent to complete the operation. In this example, as illustrated by reference 806, the provider 770 provides its portion of the encryption key k (e.g., k1) to the client 710. The client 710 then combines this portion (e.g., k1) with its own portion (e.g., k2) to create key k (e.g., where k=k1+k2).

Block 825 is also optional. In block 825, the provider 770 re-encrypts and/or blinds the trained model 870 to create a model 865. As with block 805, this may be thought of as a double combination to a locker—both parties would have to consent to complete the operation. That is, both the client and the provider have to coordinate in order to use the model 865. The model 865 is stored (see reference 826) at least temporarily in the provider 770 and may be stored for a longer duration (e.g., permanently). The resultant model 865 may then be stored in block 835 (another optional block) in a database of the client 710, e.g., by the provider 770 sending (see reference 827) the model 865 to the client 710, which stores the model 865 in the memory/memories 725.

In the inference phase 855, there are two main techniques that can be used. For both techniques, the client 710 (see reference 836) causes use of the trained model to infer a label. For both techniques, the client 710 encrypts (block 840) inference data 891 to create encrypted inference data 890.

For one of the techniques, the client causes use of the trained model to infer a label by sending (see reference 841) the encrypted inference data 890 to the provider 770. In block 845, the provider 770 applies the trained AI model 870 to the encrypted inference data 890, and infers an encrypted label 875. This inferencing (whether by client 710 or by provider 770) occurs in block 845. Reference 846 indicates the provider 770 sends the encrypted label 875 (that is, a label that is in an encrypted format, e.g., in accordance with the homomorphic encryption scheme and corresponding transformation being used) to the client 710.

Assuming the model 865 is stored in the client database 835, for the second technique, both the client and provider have to agree to use the model, and the model may be implemented on the client 710. This is illustrated by reference 837, where there is coordination between the client 710 and provider 770 for the client to decrypt, unblind, or decrypt and unblind the model 865 to create a resultant model, which is then used to infer by the client the encrypted label.

For both techniques, in block 850, the client, using key k 880, decrypts the encrypted label 875 to create a label corresponding to the training data 897. That is, as reference 851 indicates, the output is a (decrypted, in the clear) label corresponding to inference data 891.

Note that other techniques are possible. For instance, the provider 770 may store the re-encrypted/blinded model 865, and the coordination in reference 837 would be coordination between the client and the provider so that the provider 770 can perform inferencing in block 845.

Note that a different client that encrypts data with a different key that is not key 880 and sends that encrypted data to the provider 770 for inferencing in block 845 may get a result back in the form of a label that is encrypted under key k 880. Even if the different client was able to decrypt the label and get a result of a decrypted label that is ostensibly "valid" using the different key, the resultant decrypted label would be invalid as a label for the original data except by happenstance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
for a secret key that is split between a client and a computer system, providing the computer system's portion of the split secret key from the computer system to the client for the client to combine with the client's portion of the split secret key to form the secret key;
receiving, by a computer system and from the client, a set of data encrypted by a homomorphic encryption transformation, wherein the set of data encrypted by the homomorphic encryption transformation has been encrypted by the client using the secret key;
performing, by the computer system, machine learning operations using the encrypted set of data, wherein the machine learning operations build, using homomorphic encryption operations on the set of data independent of interaction with the client, a trained model of the data having a mapping between the encrypted data and output of the trained model; and
performing, by the computer system, inferencing using the trained model of other encrypted data to determine a corresponding output.

2. The method of claim 1, wherein the received encrypted set of data comprises a set of data and label pairs encrypted by the secret key, and the machine learning operations learn a relationship between the encrypted data and label pairs that becomes part of the mapping for the trained model.

3. The method of claim 2, wherein the performing the machine learning operations, using homomorphic operations, is performed so the trained model has a property of being encrypted under the secret key.

4. The method of claim 1, wherein:
the method further comprises receiving from the client the other encrypted data;
performing inferencing further comprises performing inferencing of the other encrypted data at least by accessing the trained model and predicting by using the trained model a label in an encrypted format that corresponds to the other encrypted data; and
the method further comprises sending the label toward the client for the client to decrypt the label.

5. The method of claim 4, wherein the label in the encrypted format can be decrypted only by the client with access to the secret key used to encrypt both the set of data and the other encrypted data.

6. The method of claim 1, further comprising performing re-encrypting or blinding or both re-encrypting and blinding of the trained model to create a resultant model, and storing the resultant model.

7. A method, comprising:
for a secret key that is split between a computer system and an other computer system, receiving by the computer system the other computer system's portion of the split secret key;
combining by the computer system the received portion with the computer system's portion of the split secret key to form the secret key;
encrypting, by the computer system, a set of data using a homomorphic encryption transformation that uses the secret key;
sending, by the computer system, the set of data toward the other computer system for use by the other computer system to create a model of the data having a mapping between the encrypted data and output of the model, wherein creation of the model uses machine learning operations to build the model using homomorphic encryption operations on the set of data independent of interaction by the other computer system with the computer system;
encrypting, by the computer system, other data;
causing, by the computer system, use of the model to infer a label in an encrypted format, the label corresponding to the encrypted other data; and
decrypting, by the computer system, the label to create a decrypted label, the decrypted label being a classification label that classifies the other data as one of multiple classes.

8. The method of claim 7, wherein causing use of the model to infer a label in an encrypted format further comprises:
sending by the computer system the encrypted other data toward the other computer system for the other computer system to use to infer using the model the label in the encrypted format; and
receiving by the computer system and from the other computer system the label in the encrypted format.

9. The method of claim 7, wherein the encrypted set of data comprises a set of data and label pairs encrypted by the secret key.

10. The method of claim 7, wherein the model comprises an artificial intelligence model.

11. The method of claim 7, wherein:
the method further comprises receiving by the computer system the model from the other computer system, wherein the model has been re-encrypted or blinded or both re-encrypted and blinded by the other computer system; and
causing use of the model to infer a label in an encrypted format further comprises:

coordinating between the computer system and the other computer system for the computer system to decrypt, unblind, or decrypt and unblind the model to create a resultant model; and using by the computer system the resultant model on the encrypted other data to infer the label in the encrypted format.

12. A computer system, comprising:

memory storing computer program code;

one or more processors, the one or more processors, in response to retrieval and execution of the computer program code, causing the computer system to perform operations comprising:

for a secret key that is split between a client and the computer system, providing the computer system's portion of the split secret key from the computer system to the client for the client to combine with the client's portion of the split secret key to form the secret key;

receiving, by the computer system from the client, a set of data encrypted by a homomorphic encryption transformation, wherein the set of data encrypted by the homomorphic encryption transformation has been encrypted by the client using the secret key;

performing, by the computer system, machine learning operations using the encrypted set of data, wherein the machine learning operations build, using homomorphic encryption operations on the set of data independent of interaction with the client, a trained model of the data having a mapping between the encrypted data and output of the trained model; and performing, by the computer system, inferencing using the trained model of other encrypted data to determine a corresponding output.

13. The computer system of claim 12, wherein the received encrypted set of data comprises a set of data and label pairs encrypted by the secret key, the machine learning operations learn a relationship between the encrypted data and label pairs that becomes part of the mapping for the trained model, and the performing the machine learning operations, using homomorphic operations, is performed so the trained model has a property of being encrypted under the secret key.

14. The computer system of claim 12, wherein:

wherein the one or more processors, in response to retrieval and execution of the computer program code, cause the computer system to perform operations comprising receiving from the client the other encrypted data;

performing inferencing further comprises performing inferencing of the other encrypted data at least by accessing the trained model and predicting by using the trained model a label in an encrypted format that corresponds to the other encrypted data; and wherein the one or more processors, in response to retrieval and execution of the computer program code, cause the computer system to perform operations comprising sending the label toward the client for the client to decrypt the label.

15. The computer system of claim 12, wherein:

the one or more processors, in response to retrieval and execution of the computer program code, cause the computer system to perform operations comprising: performing re-encrypting or blinding or both re-encrypting and blinding of the trained model to create a resultant model, and sending the resultant model toward the client for storage by the client.

16. The method of claim 1, wherein the performing by the computer system machine learning operations using the encrypted set of data further comprises using integer representations for inputs to and outputs from the model, and the homomorphic encryption operations are applied to integers using the integer representations.

17. The method of claim 16, where at least values for the inputs are quantized into fixed-point signed integers for the integer representations.

* * * * *